United States Patent
Takatsu

(10) Patent No.: US 6,645,415 B2
(45) Date of Patent: Nov. 11, 2003

(54) ROLLER AND METHOD OF PRODUCING THE SAME

(75) Inventor: Shigeru Takatsu, Tokyo (JP)

(73) Assignee: Tokyo Sunworker Co., Ltd. (JP)

( * ) Notice: Subject to any disclaimer, the term of this patent is extended or adjusted under 35 U.S.C. 154(b) by 256 days.

(21) Appl. No.: 09/828,141

(22) Filed: Apr. 9, 2001

(65) Prior Publication Data

US 2001/0053257 A1 Dec. 20, 2001

Related U.S. Application Data

(62) Division of application No. 09/456,511, filed on Dec. 8, 1999, now Pat. No. 6,450,689.

(51) Int. Cl.⁷ ............................................. B29C 45/14
(52) U.S. Cl. ................................... 264/262; 264/255
(58) Field of Search .............................. 264/262, 261, 264/271.1, 255, 254, 250, 245, 246, 247, 259; 29/898.04, 895.21; 384/449, 58, 543

(56) References Cited

U.S. PATENT DOCUMENTS

| | | | | | |
|---|---|---|---|---|---|
| 2,230,744 A | * | 2/1941 | Disbro | ................ | 301/5.7 |
| 2,320,541 A | * | 6/1943 | Wilson | ................ | 264/262 |
| 3,807,817 A | * | 4/1974 | Black | ................ | 384/543 |
| 4,219,240 A | * | 8/1980 | Brandenstein et al. | ........ | 301/5.7 |
| 4,602,875 A | * | 7/1986 | Doerr et al. | ................ | 384/547 |
| 4,848,938 A | * | 7/1989 | Haas et al. | ................ | 384/536 |
| 5,452,622 A | * | 9/1995 | Fenelon | ................ | 264/250 |
| 5,577,846 A | * | 11/1996 | Takahashi | ................ | 384/492 |
| 5,824,348 A | * | 10/1998 | Fujiu et al. | ................ | 264/262 |
| 6,482,140 B1 | * | 11/2002 | Takatsu | ................ | 301/5.306 |

* cited by examiner

Primary Examiner—Mark Eashoo
Assistant Examiner—Geoffrey P. Shipsides
(74) Attorney, Agent, or Firm—Bacon & Thomas, PLLC

(57) ABSTRACT

A roller. Grooves are recessed on an outer peripheral surface of an outer race in a bearing. A part of a synthetic resin tire is integrally adhered to the outer race of the bearing and is inserted and bonded within at least one of the grooves on the outer peripheral surface of the outer race in the bearing, so that firm adhesion or bonding can be obtained. Accordingly, such an adhered fitting body is prevented from being peeled off from the outer race of the bearing and the tire and the outer race of the bearing are prevented from separately detaching even when the bearing is exposed to a heavy load or rotates at a high speed.

10 Claims, 15 Drawing Sheets

FIG. 18 (Table 1)

| | WELDING FORCE | | BONDING FORCE |
|---|---|---|---|
| 1 | No welding | 1 | Peel with no resistance |
| 2 | 20% or more welding exists in outer peripheral width | 2 | 20% or more bonding exists in peeling primary resin |
| 3 | 50% or more welding exists in outer peripheral width | 3 | 20% or more bonding exists in peeling primary resin |
| 4 | 70% or more welding exists in outer peripheral width | 4 | 20% or more bonding exists in peeling primary resin |
| 5 | 100% or more welding exists in outer peripheral width | 5 | 100% or more bonding exists in peeling primary resin |

(Table 2)

(Table 3)

(Table 4)

(Table 5)

ROLLER AND METHOD OF PRODUCING THE SAME

This application is a divisional of application Ser. No. 09/456,511, filed Dec. 8, 1999 (of which the entire disclosure of the pending prior application is hereby incorporated by reference). Application Ser. No. 09/456,511 has since been patented as U.S. Pat. No. 6,450,689.

BACKGROUND OF THE INVENTION

1. Field of the Invention

The present invention relates to a roller which is exposed to a very heavy load, and is required to have a suitable elastic force and an abrasion resistance and is structured so as to mount a tire for high speed rotation and withstand heavy load such as in an escalator, a moving walkway and the like, in which a high level of safety is required, more particularly a roller mounted so that the tire and the bearing are not disengaged even when a heavy load is applied during start of the rotation and during a sudden stop, and a method of producing the same.

2. Description of the Related Art

The conventional roller used for a rotating portion which rotates at a high speed, is exposed to a heavy load, and is required to have a suitable elastic force and an abrasion resistance and requires a level of safety of the highest priority for use, such as transfer rollers, elevators, guide rollers, escalators, moving walks and the like with the mounting of a synthetic resin tire. The roller of this kind is structured such that a synthetic resin tire is integrally adhered to a smooth outer peripheral surface of an outer race in the bearing. Further, the tire provided in this kind of bearing requires an abrasion resistance and a suitable elastic force together with a resistance against a high speed rotation and a heavy load. The roller structured such that the synthetic resin tire used in the rotating portion in which a safety is required in the highest priority given is mounted to the bearing and is formed in such a manner that the tire adhered to the outer race of the bearing in a surrounding manner is formed in two layers, a tire outer peripheral portion that is made of a soft synthetic resin to meet a requirement of the abrasion resistance and the elastic force and a tire base portion directly adhered to the outer race of the bearing is made of a hard synthetic resin to bear resistance against the high speed rotation and the heavy load. It is suggested that a roller structured in such manner that the synthetic resin tire is integrally adhered to the bearing in a surrounding manner is mounted to the bearing and is constituted by hard and soft, two layer synthetic resin tire.

Conventionally, in this kind of roller, structured such that the synthetic resin tire is adhered to the outer race of the bearing, the synthetic resin tire used as the tire is integrally adhered to the outer race of the bearing in a surrounding manner, which is used as elevators, escalators, transfer rollers, guide rollers, the moving walk and the like, and rotates at a high speed, is exposed to a heavy load, is used under a very severe condition, is required to have a suitable elastic force and an abrasion resistance in accordance with a usage, and is required to have a safety with the highest priority. Accordingly, in order to obtain a stronger adhesion, it is suggested the structure be made such that the outer race of the bearing and the synthetic resin tire are integrally connected/bonded by cooling and hardening the synthetic resin temporarily and thermally dissolved on an outer peripheral surface of the outer race in place of simply bonding them together by applying an adhesive material.

Further, in order that the tire adhered to the outer peripheral surface of the outer race in the bearing is integrally adhered to the outer race of the bearing in a stronger manner, there is suggested a roller structured such that the tire is constituted by two layers comprising a soft synthetic resin and a hard synthetic resin, an inner tire made of the hard synthetic resin is directly adhered to the outer peripheral surface of the outer race in the bearing so as to obtain a stronger adhesion force, and an outer tire made of the soft synthetic resin is adhered in such a manner as to overlap with the hard synthetic resin inner tire, whereby the tire having two layers is adhered to the outer peripheral surface of the outer race of the bearing in a stronger manner.

Further, in the roller to which this kind of synthetic resin tire is mounted, in order to integrally adhere the synthetic resin tire having the hard and soft two layers to the outer race of the bearing, this has been produced by a method of integrally providing the soft resin tire outer peripheral portion on the outer peripheral surface of the hard synthetic resin tire base portion in a surrounding manner after adhering the hard synthetic resin tire base portion to the outer race of the bearing.

Further, in a method of producing a synthetic resin wheel, there is suggested a producing method comprising steps of forming a tire portion by the soft synthetic resin having a forming temperature lower than that of a wheel portion and forming the wheel portion along an inner side of the tire portion by the hard synthetic resin having a forming temperature higher than that of the tire portion.

In this kind of conventional roller, the synthetic resin tire is integrally adhered to the outer peripheral surface of the outer race in the bearing. Further, since the outer peripheral surface of the outer race in this kind of bearing is formed in a smooth surface, a strong adhesion force over a certain level can not be expected by an interlinking of the adhesive material between the synthetic resin tire adhered by the adhesive material or the like and the outer peripheral surface of the outer race. Accordingly, the synthetic resin tire integrally adhered to the outer race can not stand against the heavy load and the high speed rotation over a certain level when being used in elevators, escalators and the like, so that the adhesion between the outer race and the tire is separated and the tire races on the outer race of the bearing. In the worst case, there is a problem that the tire is taken out from the outer race of the bearing so as to slip off.

Further, in order that the outer race of the bearing and the synthetic resin tire are more firmly adhered to each other, the structure is made so as to firmly adhere the synthetic resin tire on the outer peripheral surface of the outer race by cooling and hardening the temporarily dissolved synthetic resin on the outer race of the bearing in place of the adhesion by simply applying the adhesive material. In this structure, in comparison with the structure simply bonded by an application of the adhesive material, a strong adhesion force can be obtained, however, in this kind of roller used in elevators, escalators, transfer rollers and the like, since there is a case that a significantly heavy load is applied at a starting time or at a time of a sudden stop and a severe using condition that it is necessary to rapidly stop the high speed rotating roller at a time of high speed rotation or a sudden stop is required, there is a problem that the adhesion between the tire and the outer race of the bearing is damaged and peeled off during the use, so that the tire races on the outer race and falls off from the outer race.

Further, in order that the tire adhered to the outer peripheral surface of the outer race in the bearing is integrally adhered to the outer race of the bearing in a stronger manner, the structure is made such that a roller structured such that the tire is constituted by two layers comprising a soft synthetic resin and a hard synthetic resin, an inner tire made of the hard synthetic resin is directly adhered to the outer peripheral surface of the outer race in the bearing so as to obtain a stronger adhesion force, and an outer tire made of the soft synthetic resin is adhered in such a manner as to overlap with the hard synthetic resin inner tire, whereby the tire having two layers is adhered to the outer peripheral surface of the outer race of the bearing in a stronger manner. In this roller, in comparison with the structure made so as to integrally adhere the tire to the outer race by bonding the synthetic resin tire by an application of the adhesive material or cooling and hardening the thermally dissolved synthetic resin on the outer race, a more firm adhesion force can be obtained, however, a load of some hundreds kilograms per 1 cm2 may be applied, and a high speed rotation of some thousands per 1 minute is required. Accordingly, the adhesion between the tire and the outer race of the bearing is damaged and peeled off during the use, so that there is a problem that the tire races on the outer race and falls off from the outer race.

Further, in a conventional method of integrally providing the soft resin tire outer peripheral portion on the outer peripheral surface of the hard synthetic resin tire base portion in a surrounding manner after adhering the hard synthetic resin tire base portion to the outer race of the bearing, when the soft synthetic resin tire outer peripheral portion is adhered onto the outer peripheral surface of the tire base portion in a surrounding manner, since a sealing performance of the tire outer peripheral portion with respect to the tire base portion is deteriorated, it is necessary to firmly bond the tire outer peripheral portion to the tire base portion by the adhesive material. Accordingly, a step of uniformly applying the adhesive material to all the surface of the outer peripheral surface with respect to the tire base portion is required and a problem results in that the roller itself is broken due to peeling off from the bonding portion when rotating at a high speed and under a heavy load in the case of bonding by the adhesive material. Further, there is a problem that a sufficient skill is required for uniformly applying the adhesive material on all the surface of the outer peripheral surface with respect to the tire base portion, a producing step is complex and a producing cost is increased.

Further, in the roller which is exposed to the heavy load and stopped for a sufficiently long time, such as in the escalator and the like, when using this kind of conventional roller to which the conventional soft synthetic resin tire is mounted, the synthetic resin tire can not stand against the heavy load while the rotating operation of the roller is stopped, so that there is a problem that the portion to which the load is applied is pressed, deformed and recessed (so-called an abraded out state) and an expansion is formed on the tire in front of and at the back of a rotating direction of the roller, thereby disturbing the rotation of the roller at the starting time.

Further, in the method of producing the synthetic resin wheel as disclosed in Japanese Patent Laid-Open No. 297606/1994, comprising the steps of forming the tire portion by the soft synthetic resin having a forming temperature lower than that of the wheel portion and forming the wheel portion along the inner side of the tire portion by the hard synthetic resin having a forming temperature higher than that of the tire portion, since the tire portion is formed by the soft synthetic resin having the forming temperature lower than that of the wheel portion and the wheel portion is formed along the inner side of the tire portion by the hard synthetic resin having a forming temperature higher than that of the tire portion, it is favorable that the soft synthetic resin tire portion and the hard synthetic resin wheel portion are integrally connected without using the adhesive material, however, it is necessary to mount the metal bearing by bonding to the inner side of the wheel portion of the integrally connected tire portion and wheel portion. Accordingly, in the roller for the escalator and the like in which the heavy load and high speed rotation, the abrasion resistance and a certain elastic force are required, there is a problem that the adhesion between the bearing and the wheel portion by the adhesive material is peeled off.

Further, in the method of producing the synthetic resin wheel as disclosed in Japanese Patent Laid-Open No. 297606/1994, comprising the steps of forming the tire portion by the soft synthetic resin having a forming temperature lower than that of the wheel portion and forming the wheel portion along the inner side of the tire portion by the hard synthetic resin having a forming temperature higher than that of the tire portion, since the wheel portion is integrally formed along the inner side of the tire portion and the bearing is later inserted and mounted to the wheel portion, the wheel portion can not be integrally bonded to the tire portion and the bearing at a time, so that there is a problem that a step for mounting and fixing the bearing to the wheel portion is required.

Further, when it is intended to pour the hard synthetic resin having a forming temperature higher than that of the soft synthetic resin in the tire portion so as to charge and integrally bond the bearing with the wheel portion at the same time of providing the wheel portion in the inner side of the tire portion, that is, for forming the wheel portion between the tire portion and the bearing by the method of producing the synthetic resin wheel disclosed in Japanese Patent Laid-Open No. 297606/1994, comprising the steps of forming the tire portion by the soft synthetic resin having a forming temperature lower than that of the wheel portion and forming the wheel portion along the inner side of the tire portion by the hard synthetic resin having a forming temperature higher than that of the tire portion, a gas is generated on a contact surface between the poured hard synthetic resin and the soft synthetic resin in the tire portion, the tire portion and the wheel portion can not be completely bonded all over the surface due to the generated gas, and only a part which is not influenced by the gas is bonded, so that there is a problem that the tire portion and the wheel portion are peeled off when used in the escalator roller and the like which rotates at a high speed and is exposed to a heavy load.

SUMMARY OF THE INVENTION

An object of the present invention is to solve the technical problems of this type of conventional roller structured so as to integrally adhere the synthetic resin tire to the outer race of the bearing. In accordance with the present invention, there is provided a roller structured so as to more firmly and integrally adhere the synthetic resin tire to the outer peripheral surface of the an outer race of the bearing and is more firmly adhered without peeling off and the tire and the outer race of the bearing do not independently and freely rotate, that is, so as to prevent a rotation. Further, another object of the present invention is to solve the technical problem of the conventional method of producing the synthetic resin wheel and the method of producing the roller to which the overlaid synthetic resin tire is mounted as mentioned above. In accordance with the present invention, there is provided a roller and a method of producing the same comprising the steps of concentrically arranging a soft synthetic resin tire outer peripheral portion and a bearing which are previously formed at a gap and pouring a hard synthetic resin having a melting point higher than that of the tire outer peripheral portion into the gap so as to charge and form a tire base portion integrally bonded with the tire outer peripheral portion and the bearing.

The inventors of the present invention have researched and solved the technical problems mentioned above in the conventional art, and as a result, have developed a roller to which the tire is mounted so as to be prevented from racing (detachment therefrom) and a method of producing the same was developed.

A roller to which a tire is mounted so as to prevent racing in accordance with the present invention is characterize in that a synthetic resin tire overlaid in hard and soft layers is integrally adhered on an outer peripheral surface of an outer race in a bearing so as to be more firmly adhered without peeling off, one or a plurality of grooves having a fixed depth and width are spirally recessed on the outer peripheral surface of the outer race in the bearing in a surrounding manner so that the tire and the outer race of the bearing do not independently and freely rotate, that is, so as to more firmly and integrally adhere the tire to the outer race of the bearing in such a manner as to prevent rotation, and a part of the synthetic resin tire is inserted and bonded within the grooves on the outer peripheral surface of the outer race in the bearing, thereby being adhered so that a more firm adhesion force can be obtained.

In accordance with the present invention, there is provided a structure in which one or a plurality of grooves are recessed on the outer peripheral surface of the outer race in the bearing, a tire base portion made of a hard synthetic resin is integrally adhered to all the peripheral surface of the outer peripheral surface in the outer race, and a tire outer peripheral portion made of a soft synthetic resin is integrally bonded on all the peripheral surface of the outer peripheral surface in the tire base portion.

In accordance with the present invention, there is provided a structure in which one or a plurality of grooves are recessed on the outer peripheral surface of the outer race in the bearing, a tire base portion made of a hard synthetic resin is integrally adhered to all the peripheral surface of the outer peripheral surface in the outer race, an adhered recessed surface is provided in a surrounding manner by forming the outer peripheral surface of the tire base portion in a circular arc shape, one or a plurality of grooves are recessed on an adhered recessed surface, and a tire outer peripheral portion made of a soft synthetic resin is integrally bonded on all the peripheral surface of the outer peripheral surface in the tire base portion.

In accordance with the present invention, there is provided a structure in which a plurality of grooves are recessed on the outer peripheral surface of the outer race in the bearing in a surrounding manner by arranging in a spiral manner.

In accordance with the present invention, there is provided a structure in which a plurality of grooves are recessed on the outer peripheral surface of the outer race in the bearing in a surrounding manner in parallel and in a direction perpendicular to an axial direction of the bearing.

In accordance with the present invention, there is provided a structure in which one or a plurality of grooves are obliquely recessed on the outer peripheral surface of the outer race in the bearing in a surrounding manner at a fixed angle of incline with respect to an axial direction of the bearing in a spiral manner.

In accordance with the present invention, there is provided a structure in which a plurality of grooves are spirally recessed on the outer peripheral surface of the outer race in the bearing in a surrounding manner and the grooves are mutually crossed on the outer peripheral surface of the outer race.

In accordance with the present invention, there is provided a structure in which a thickness of the outer race of the bearing coincides with a size obtained by adding a depth of a groove portion of the groove to a thickness of an outer race of a standard bearing in accordance with an international standard.

A method of producing a roller to which a tire is mounted so as to prevent racing in accordance with the present invention comprises the steps of arranging a bearing having one or a plurality of grooves on an outer peripheral surface of an outer race with a gap concentrically provided in an inner side of a tire made of a soft synthetic resin, and pouring and charging a hard synthetic resin having a melting point higher than a melting point of a soft synthetic resin in a tire outer peripheral portion into a space formed between the tire outer peripheral portion and the outer race of the bearing so as to form a tire base portion, whereby the tire base portion is integrally bonded to the bearing and the tire outer peripheral portion.

In accordance with the present invention, there is provided a method of producing a roller to which a tire is mounted so as to prevent racing comprising the steps of arranging a bearing having one or a plurality of grooves on an outer peripheral surface of an outer race with a gap concentrically provided in an inner side of a tire made of a soft synthetic resin having a melting point of 190° C., and heating, dissolving, pouring and charging a hard synthetic resin having a melting point of 210° C. into a space formed between the tire outer peripheral portion and the bearing so as to form a tire base portion, whereby the tire base portion is integrally bonded to the bearing and the tire outer peripheral portion.

In accordance with the present invention, there is provided a method of producing a roller to which a tire is mounted so as to prevent racing comprising the steps of arranging a bearing having one or a plurality of grooves on an outer peripheral surface of an outer race with a gap concentrically provided in an inner side of a tire made of a soft polyurethane rubber having a melting point of 190° C., and heating, dissolving, pouring and charging a thermoplastic hard polyurethane rubber having a melting point of 210° C. into a space formed between the tire outer peripheral portion and the bearing so as to again dissolve and mix a part of the soft polyurethane rubber on the surface of the tire outer peripheral portion on a contact surface, thereby forming a tire base portion, whereby the tire base portion is integrally bonded to the bearing and the tire outer peripheral portion.

In accordance with the present invention, there is provided a method of producing a roller to which a tire is mounted so as to prevent detachment therefrom comprising the step of protruding an inner peripheral surface in an inside direction of the tire outer peripheral portion towards a center direction so as to form a circular arc inner peripheral surface having a cross section formed in a circular arc.

In accordance with the present invention, there is provided a method of producing a roller to which a tire is mounted so as to prevent detachment therefrom, comprising the step of spirally recessing a plurality of grooves on the outer peripheral surface of the outer race of the bearing to which the tire base portion is adhered/bonded in a surrounding manner.

In accordance with the present invention, there is provided a method of producing a roller to which a tire is mounted so as to prevent detachment therefrom comprising the steps of spirally recessing a plurality of grooves on the outer peripheral surface of the outer race of the bearing to which the tire base portion is bonded in a surrounding manner, recessing the grooves in a direction perpendicular to the axial direction of the roller and in parallel in a surrounding manner, spirally and obliquely recessing at an angle of incline with respect to an axial direction of the bearing, or spirally recessing the grooves so as to cross the grooves to each other on the outer peripheral surface of the outer race.

BRIEF DESCRIPTION OF THE DRAWINGS

FIG. 18 is a table which shows a peeling test result with respect to a roller to which a tire is mounted so as to prevent racing produced in accordance with the present invention, the table corresponding to Table 1;

DESCRIPTION OF THE PREFERRED EXAMPLES

Figure 1:
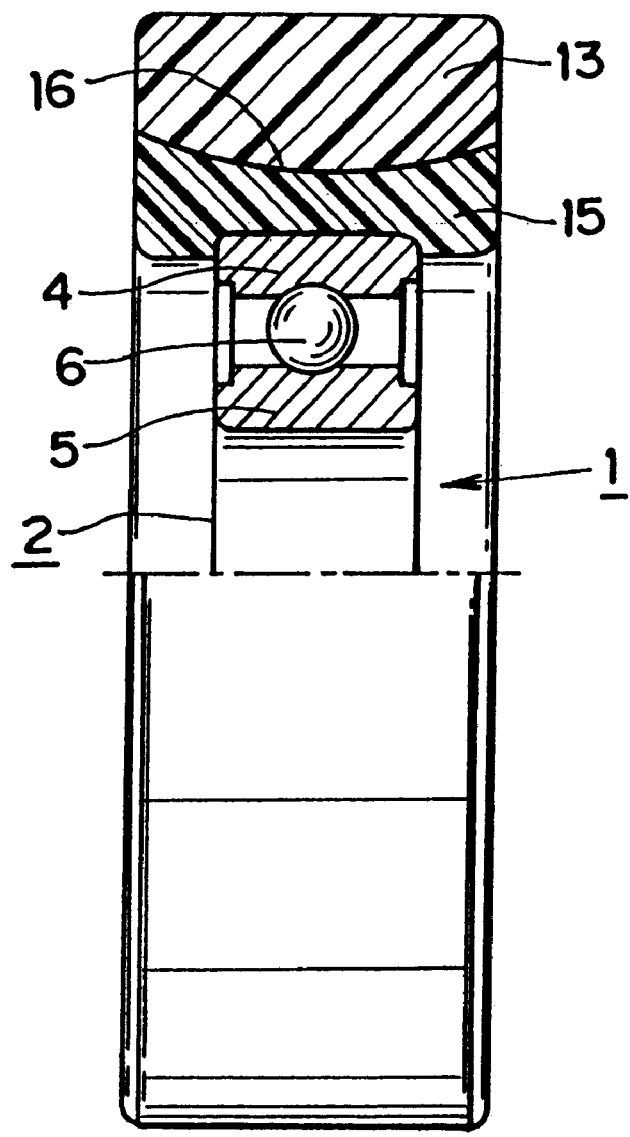
FIG. 1 is a perspective view of a cross section of a part of a roller in which a tire produced in accordance with a producing method of the present invention is mounted so as to prevent racing.
Figure 2:
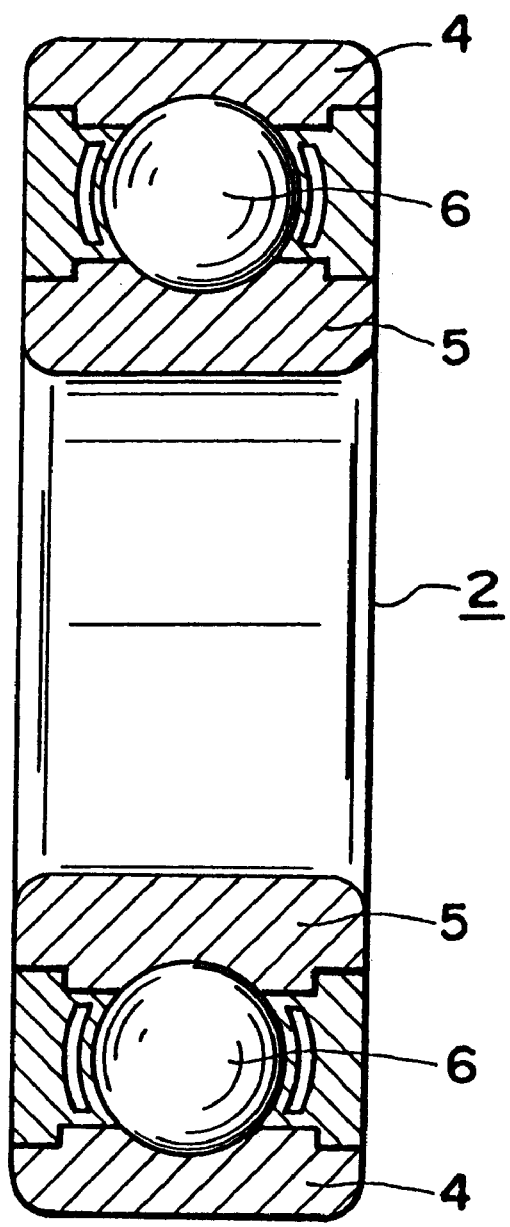
FIG. 2 is a cross sectional view of a bearing in accordance with the present invention.

Next, the present invention will be described below on the basis of examples, however, the examples do not limit the present invention.

A description will now be given below of an example in accordance with the present invention below with reference to FIGS. 1 to 17.

A roller 1 of the present invention is structured such that a synthetic resin tire 3 is integrally adhered to a bearing 2, the bearing 2 made of metal to which the tire 3 is mounted is rotatably structured such that concentrically circular ring shaped metal outer race 4 and inner race 5 hold a multiplicity of rotatable metal balls 6 therebetween, and the synthetic resin tire 3 is integrally poured, solidified and adhered/bonded on an outer peripheral surface 7 of the outer race 4 in the bearing 2. As mentioned above, the bearing 2 of the present invention is constituted by the outer race 4, the inner race 5, the ball 6 and the tire 3 are integrally adhered on the outer peripheral surface 7 of the outer race 4. An outside diameter and a thickness of the bearing 2 is suitably selected in accordance with kind, size, weight, usage and a condition of a material to be transferred, for example, a width of the outer peripheral surface of the outer race 4 in the radial bearing 2 is set to a size obtained by adding 1 mm to an international standard size.

The tire 3 adhered to the metal bearing 2 is made of a polyurethane rubber synthetic resin, and has the same width as the width of the outer peripheral surface of the bearing 2, and is structured such that a part of the inner surface of the tire 3 is cooled and hardened within a groove portion of a groove 8 recessed on an outer peripheral surface of the outer race 4 in a surrounding manner by completely inserting a part of a thermally dissolved polyurethane rubber synthetic resin into the groove portion of the groove 8. Thus, the bearing 2 and the tire 3 are firmly and integrally adhered.

In this case, the tire 3 is integrally adhered to the metal bearing 2 and is made of the polyurethane rubber synthetic resin and a whole of the tire is formed by one layer made of a hard polyurethane rubber or a soft polyurethane rubber, or the tire 3 may be, if necessary, formed by a polyurethane synthetic rubber adhered directly to the outer peripheral surface of the outer race 4 of the bearing 2 and a whole of the tire 3 is formed by one layer of the hard polyurethane rubber or the soft polyurethane rubber, or the polyurethane rubber adhered directly to the outer peripheral surface of the outer race 4 of the bearing 2 that is made of an inner fitting body made of the hard polyurethane rubber, if necessary, and the tire 3 on the upper side made of the soft polyurethane rubber that is integrally adhered to the upper portion of the inner tire 3 made of the hard polyurethane rubber, thus making the tire 3 with two layers made of the hard polyurethane rubber and the soft polyurethane rubber.

The groove 8 recessed on the outer peripheral surface of the outer race 4 of the metal bearing 2 is formed by bringing a bit of a cutting tool into contact with the outer race 4 of the bearing 2 mounted in such a manner as to be rotated by a lathe so as to cut, so that one or a plurality of grooves 8 which are spirally arranged or crossed or arranged in parallel can be easily cut in such a manner as to have an optional depth and groove width.

A thickness of the outer race 4 of the metal bearing 2 is set to a thickness obtained by adding a depth of the groove portion of the groove 8 to a thickness of the outer race 4 of a so-called standard bearing in accordance with an international standard, which is generally produced and used on the basis of a standard united in accordance with an international standard in the technical field.

As mentioned above, since the outer race 4 is formed in the thickness obtained by adding the depth of the groove portion of the groove 8 to the thickness of the outer race 4 of the bearing 2 generally used as the standard bearing, there is effects that a strength of the bearing 2 of the present invention is not decreased even when the groove 8 is recessed on the outer race 4 in a surrounding manner, and there is no risk that the tire 3 is peeled off and falls off due to an application of a horizontal load.

The outer peripheral surface 7 of the outer race 4 of the bearing 2 is formed in a smooth surface and has the groove 8 having a depth of 0.5 mm and a width of 1.5 mm and spirally recessed in a surrounding manner, and one groove or a plurality of the grooves are obliquely recessed at a fixed angle of incline with respect to an axial direction of the bearing 2 in a surrounding manner as occasion demands.

Figure 3:
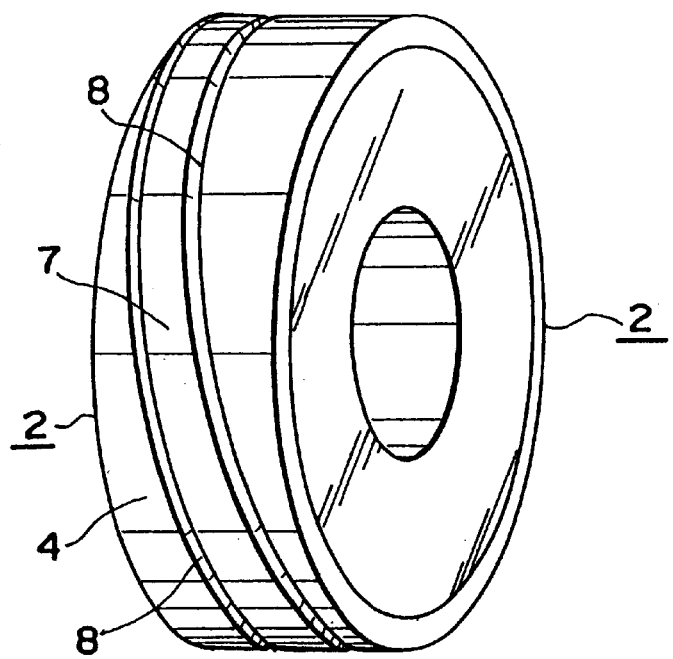
FIG. 3 is a perspective view of a bearing in accordance with the present invention.
Figure 4:
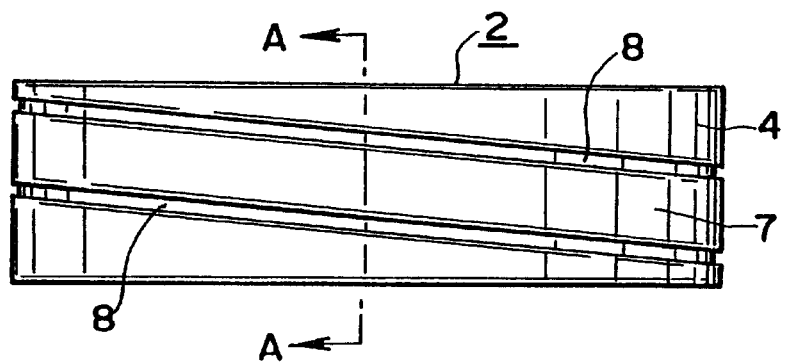
FIG. 4 is a plan view of FIG. 3 in accordance with the present invention.

The groove 8 recessed on the outer peripheral surface 7 of the outer race 4 of the bearing 2 is formed in one spiral shape as shown in FIGS. 3 and 4.

Since the groove 8 is formed in one spiral shape provided on the outer peripheral surface 7 of the outer race 4, there is an effect that the groove 8 can be comparatively easily cut on the groove 8 of the outer peripheral surface 7 of the bearing 2 by rotating the bearing 2 by means of the lathe, using the bit of the cutting tool.

Figure 6:
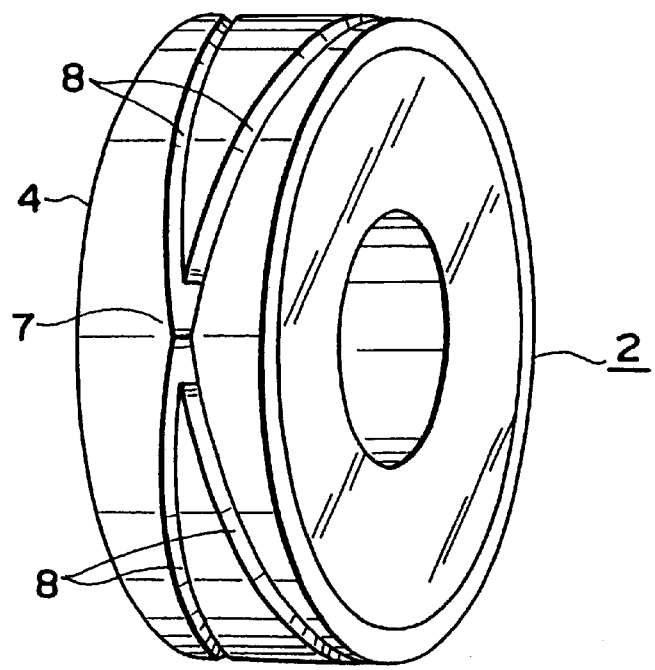
FIG. 6 is a perspective view of a bearing in accordance with the present invention.
Figure 7:
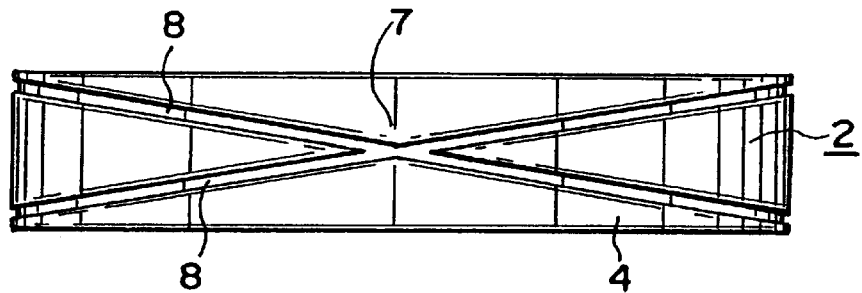
FIG. 7 is a plan view of FIG. 6 in accordance with the present invention.

The groove 8 recessed on the outer peripheral surface 7 of the outer race 4 of the bearing 2 in a surrounding manner is spirally formed in a surrounding manner so that two grooves 8 is obliquely provided at a fixed angle of incline with respect to an axial direction of the bearing 2 and mutually cross in a substantially center portion of the outer peripheral surface 7, as shown in FIG. 6.

Since the groove 8 is spirally provided in a surrounding manner on the outer peripheral surface 7 of the outer race 4 in a manner as to cross to each other, a bonding surface between the inner surface of the tire 3 and the groove 8 of the outer peripheral surface 7 of the bearing 2 becomes wider, and the groove 8 bonding the tire 3 to the outer peripheral surface 7 is uniformly provided on the outer peripheral surface 7 of the outer race 4, so that there is an effect that a more firm adhesion force between the tire 3 and the bearing 2 can be obtained.

Figure 14:
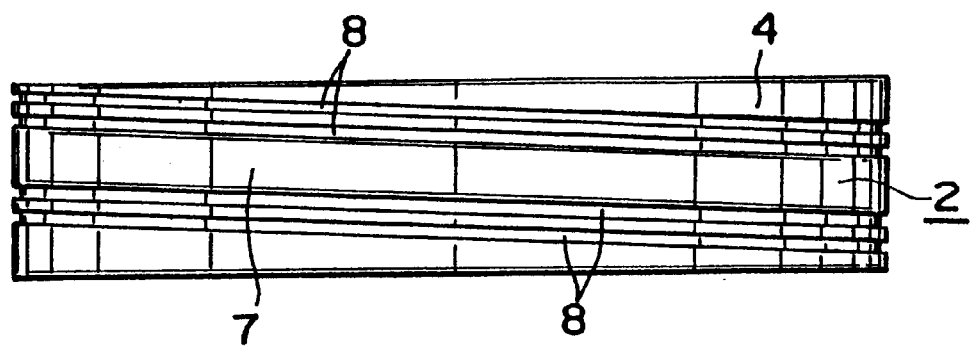
FIG. 14 is a plan view of a main portion which shows the other example in accordance with the present invention;FIG.
Figure 15:
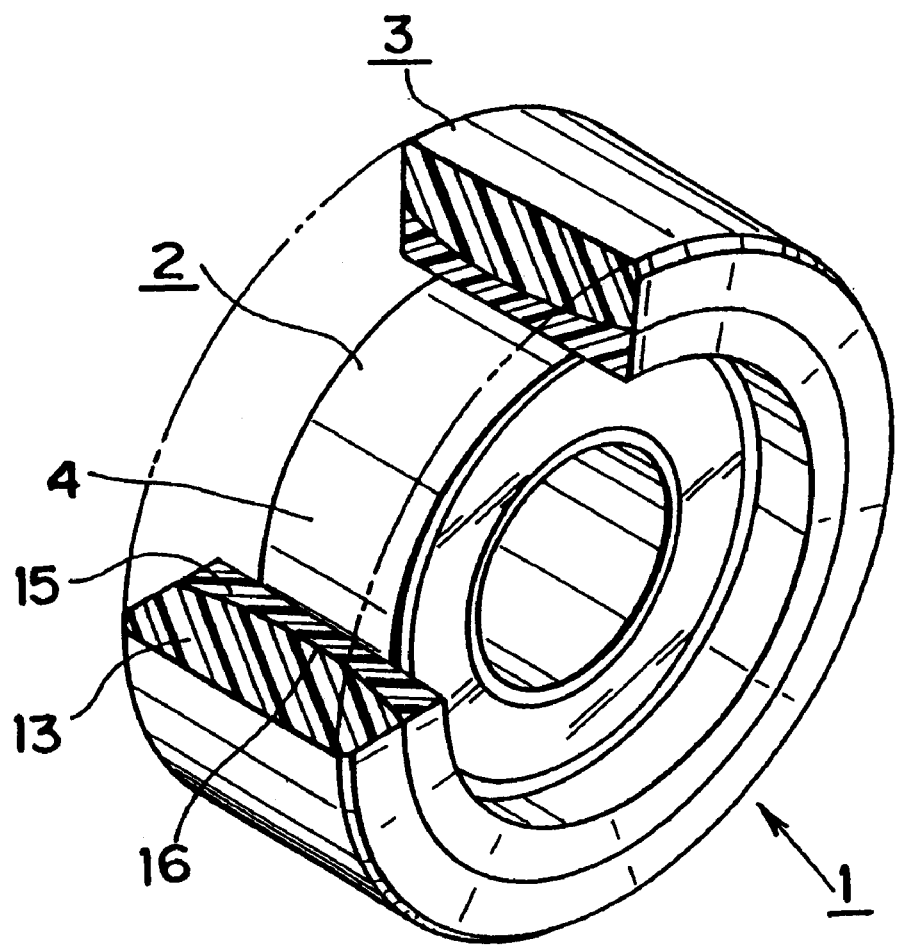
FIG. 15 is a perspective view of a cross section of a part a fitting body adhered to a bearing in accordance with the present invention.

The groove 8 recessed on the outer peripheral surface 7 of the outer race 4 of the bearing 2 in a surrounding manner is, as shown in FIG. 14, formed such that two grooves are spirally arranged in parallel in a surrounding manner.

Since two grooves 8 are spirally provided on the outer peripheral surface 7 of the outer race 4 in a surrounding manner, the groove 8 can be cut and recessed on the outer peripheral surface 7 of the bearing 2 in a comparatively easy manner by rotating the bearing 2 by the lathe and placing the bits of two cutting tools in parallel. Further, there is an effect that an area of the groove 8 for adhering the tire 3 to the outer peripheral surface 7 of the outer race 4 is expanded, whereby a more firm adhesion force can be obtained.

Figure 8:
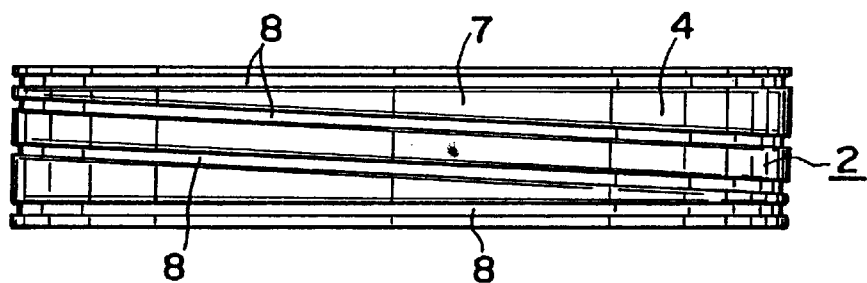
FIG. 8 is a plan view of a main portion which shows another example in accordance with the present invention.
Figure 9:
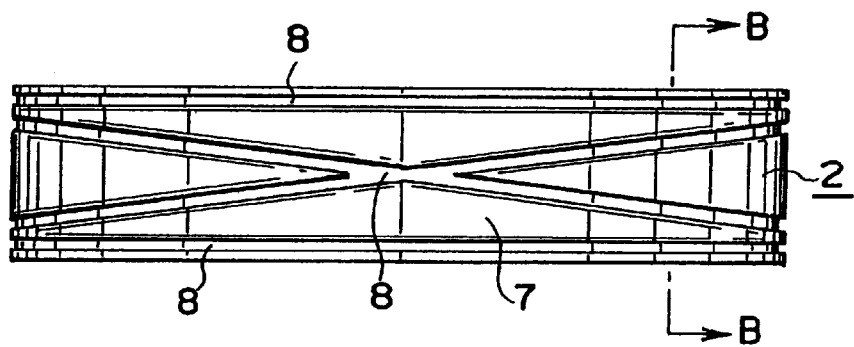
FIG. 9 is a plan view of a main portion which shows the other example in accordance with the present invention.

The groove 8 recessed on the outer peripheral surface 7 of the outer race 4 of the bearing 2 in a surrounding manner is, as shown in FIGS. 8 and 9, independently provided in parallel to a direction of both side lines of the outer race 4 in addition to the groove 8 recessed on the peripheral surface of the outer peripheral surface 7 of the outer race 4 in a surrounding manner.

As mentioned above, the groove 8 is independently provided in parallel to a direction of both side lines of the outer race 4 in addition to the groove 8 recessed on the peripheral surface of the outer peripheral surface 7 of the outer race 4 in a surrounding manner, there is an effect that a bonding surface with respect to the groove 8 on the inner surface of the tire 3 and the outer peripheral surface 7 of the bearing 2 is expanded, both side lines of the tire 3 are firmly adhered in the direction of both side lines of the outer race 4, and there is no risk that the tire 3 falls off.

Figure 5:
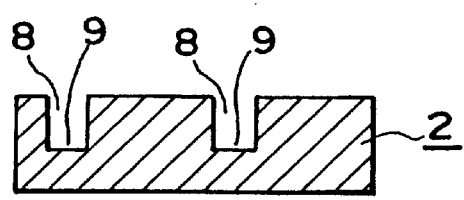
FIG. 5 is a cross sectional view of a main portion of FIG. 3 in accordance with the present invention.
Figure 10:
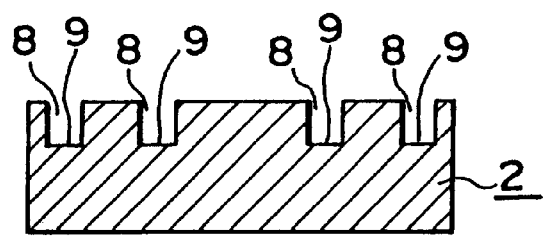
FIG. 10 is a cross sectional view of a main portion of FIG. 9 in accordance with the present invention.
Figure 11:
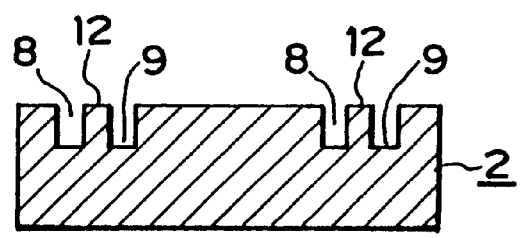
FIG. 11 is a cross sectional view of a main portion which shows the other example in accordance with the present invention.
Figure 12:
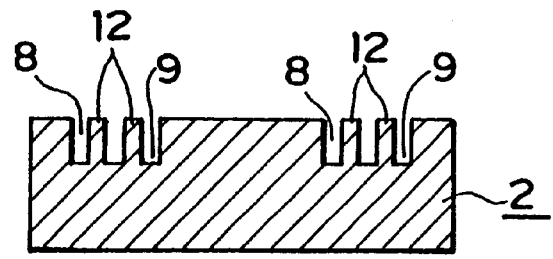
FIG. 12 is a cross sectional view of a main portion which shows the other example in accordance with the present invention.

The groove 8 recessed on the outer peripheral surface 7 of the outer race 4 of the bearing 2 in a surrounding manner is, as shown in FIGS. 5 and 10, recessed so as to form a substantially U-shaped cross section, and one or two convex bodies 12 are provided within the groove portion 9 of the groove 8 recessed in a substantially U-shaped cross section at a fixed interval in the same direction as that of the groove 8 in a surrounding manner as shown in FIGS. 11 and 12 as occasion demands.

As mentioned above, when one or two convex bodies 12 are provided within the groove portion 9 of the groove 8 recessed in a substantially U-shaped cross section at a fixed interval in the same direction as that of the groove 8 in a surrounding manner, there is an effect that a bonding surface with respect to the groove 8 between the tire 3 inserted into the groove portion 9 of the groove 8 and the groove 8 is thereby expanded and an adhesion force firmer at that degree can be obtained.

Figure 13:
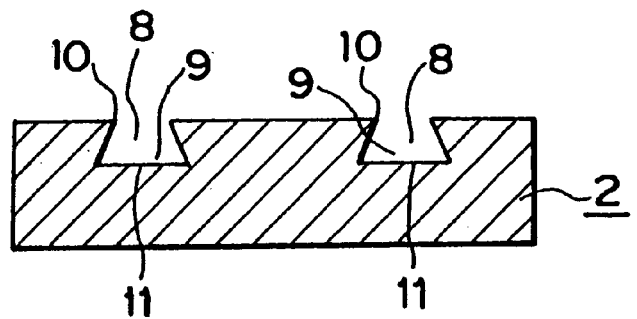
FIG. 13 is a cross sectional view of a main portion which shows the other example in accordance with the present invention.

The groove portion 9 of the groove 8 recessed on the outer peripheral surface 7 of the outer race 4 of the bearing 2 is, as shown in FIG. 13, recessed so as to form a substantially U-shaped cross section, and a groove bottom portion 11 of the substantially U-shaped groove portion 9 is formed so as to form a substantially tapered cross sectional shape which is wider than that of a groove opening 10.

As mentioned above, since the groove bottom portion 11 of the groove portion 9 in the groove 8 is formed wider than that of the groove opening 10 so as to form a substantially tapered cross sectional shape, a part of the tire 3 is firmly inserted and adhered to the groove portion 9 of the groove 8 on the outer peripheral surface 7 of the outer race 4, so that there is an effect that the tire 3 and the bearing 2 can obtain a firm adhesion force.

A thickness of the outer race 4 of the bearing 2 is formed so as to have a thickness obtained by adding the depth of the groove portion 9 of the groove 8 to the thickness of the outer race of the standard bearing in accordance with the international standard.

As mentioned above, since the thickness of the outer race 4 of the bearing 2 in accordance with the present invention corresponds to the thickness obtained by adding the depth of the groove portion 9 of the groove 8 to the thickness of the outer race of the standard bearing in accordance with the generally used international standard, in the bearing of the present invention, there is an effect that there is not a risk that the strength thereof is not decreased even when recessing the groove 8 on the outer race 4 and the fitting body is peeled off and falls off even when the horizontal load is applied.

Since the roller in accordance with the present invention is structured such that one or a plurality of grooves having a fixed depth and width are recessed on the outer peripheral surface of the outer race of the bearing in a surrounding manner, a part of the synthetic resin tire integrally adhered to the outer peripheral surface of the outer race of the bearing is poured, solidified and adhered/bonded within the groove on the outer peripheral surface of the outer race in the bearing, so that the outer race of the bearing and the tire are integrally adhered so as to be more firmly adhered. Accordingly, the roller is not peeled off so that the tire and the outer race of the bearing do not separately race.

Next, a description will be given in detail of a method of producing a roller to which a tire is mounted so as to prevent racing in accordance with the present invention on the basis of the examples shown in FIGS. 1, 2, 15, 16 and 17.

FIG. 1 shows a roller 1 to which the tire 3 obtained by overlaying the hard synthetic resin and the soft synthetic resin prepared in accordance with a producing step of the producing method of the present invention. The roller 1 to which the tire 3 obtained by overlaying the hard synthetic resin and the soft synthetic resin is mounted is produced by placing the roller 1 between the tire outer peripheral portion 13 made of the soft synthetic resin and the bearing 2 made of the metal at an interval 14 and pouring and charging the thermoplastic hard synthetic resin having a melting point higher than that of the soft synthetic resin in the tire outer peripheral portion 13 so as to form the tire base portion 15 integrally adhered or bonded with each of the tire outer peripheral portion 13 and the bearing 2.

Figure 16:
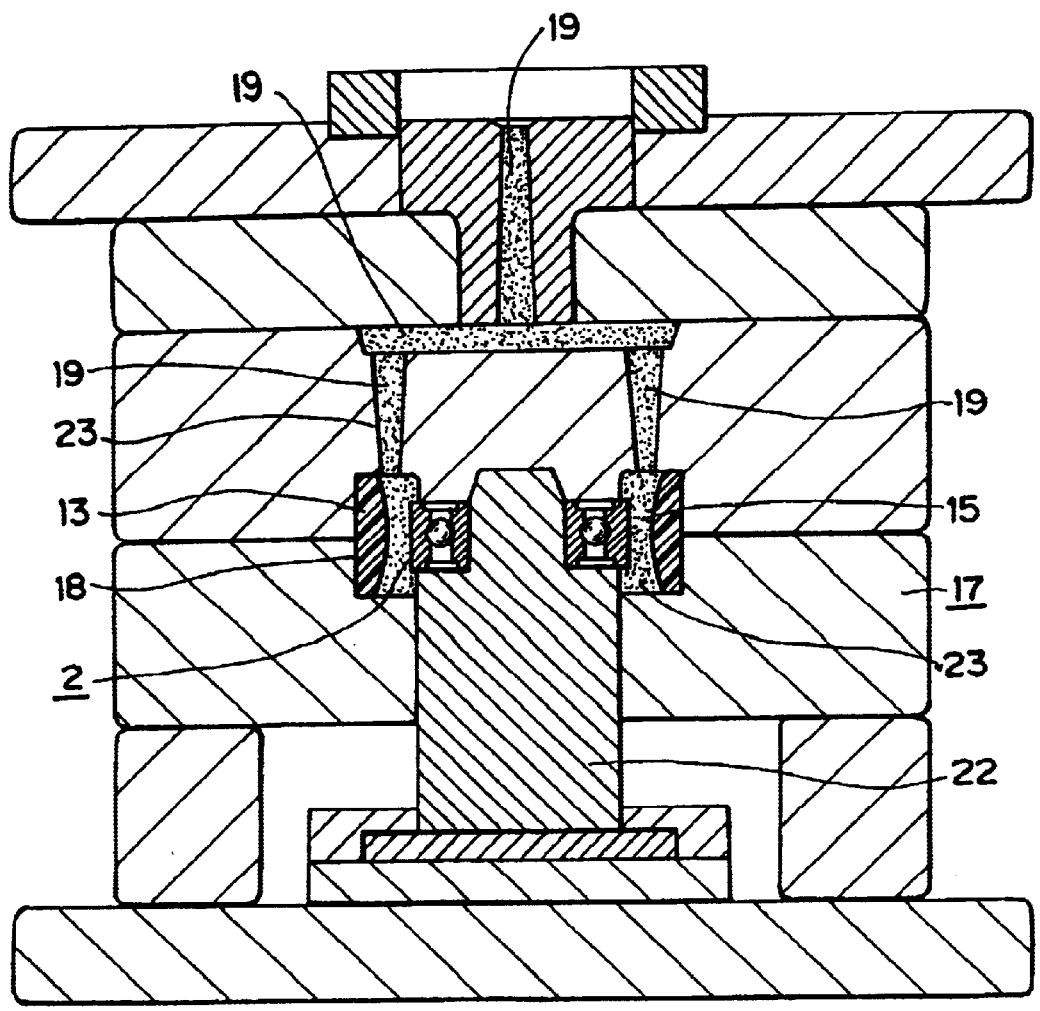
FIG. 16 is a cross sectional view for showing a step of producing with a metal mold mounted to an injection molding apparatus used for producing a roller to which a tire is mounted so as to prevent racing in accordance with the present invention.
Figure 17:
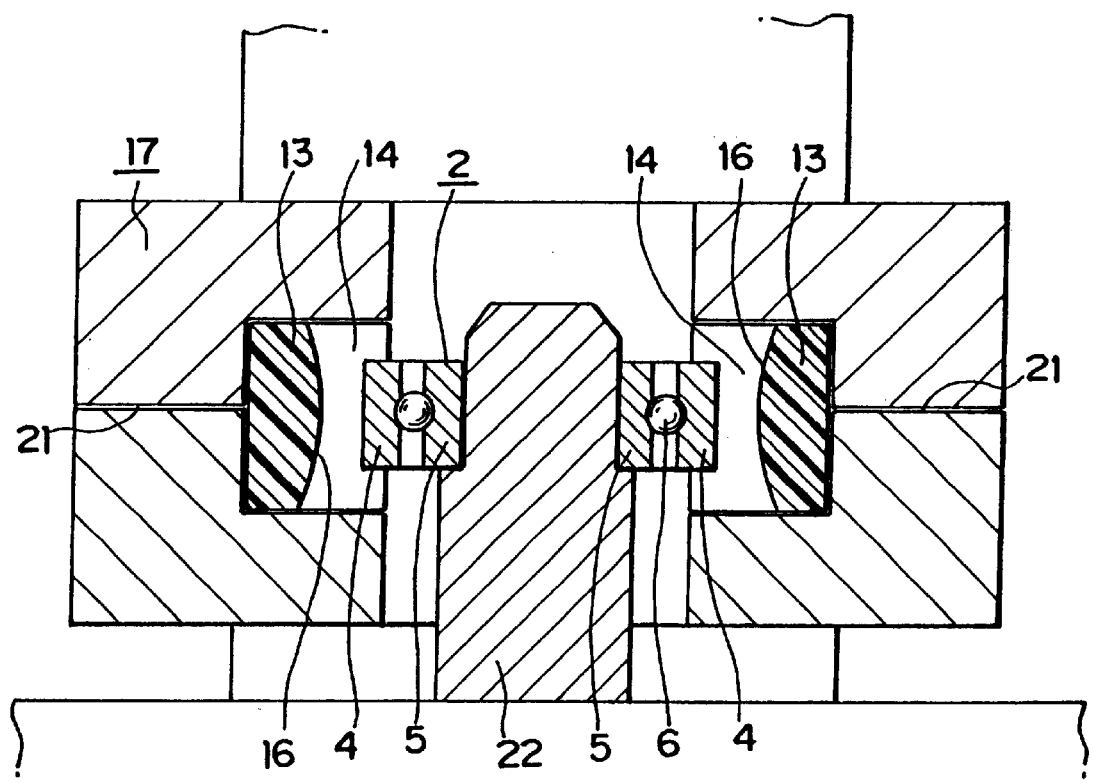
FIG. 17 is a cross sectional view which shows a main portion of the metal mold in FIG. 16.

FIG. 17 shows a metal mold 17 which is mounted and fixed to an injection molding apparatus used for forming the roller 1 to which the tire 3 obtained by overlaying the hard synthetic resin and the soft synthetic resin is mounted by the method of producing the roller to which the tire is mounted so as to prevent detachment in accordance with the present invention, and is used in accord with the injection molding apparatus. The bearing 2 rests on a stand 22, as shown in FIG. 16.

In the present invention, the soft synthetic resin constituting the tire outer peripheral portion 13 has an abrasion resistance and a heat resistance, further has a flexibility and an elasticity and lacks a strength for a roller for the escalator. The hard synthetic resin constituting the tire base portion 15 has a strength for the roller for the escalator. Further, in the example, the soft polyurethane rubber is used for the soft synthetic resin. However, it is possible to use the other suitable soft elastomer and the like may be used, and the soft synthetic resin is not limited to this example.

Further, in the example in the present invention, the thermoplastic hard polyurethane rubber is used for the hard synthetic resin, however, it is not limited to the hard synthetic resin, and the other suitable plastomer such as a nylon may also be used.

Further, in order to mold the roller to which the tire obtained by overlaying the hard synthetic resin and the soft synthetic resin is mounted on the basis of the method of producing the roller to which the tire is mounted so as to prevent racing in accordance with the present invention, it is possible to provide a step of degreasing an inner peripheral surface in an inner direction of the tire outer peripheral portion 13 in a normal way before forming the tire base portion 15 along the inner side of the tire outer peripheral portion 13. The degreasing step includes applying a primer in addition to sweeping fat and oil and dirt attached to the inner peripheral surface of the tire outer peripheral portion 13.

In order to mold the roller to which the tire obtained by overlaying the hard synthetic resin and the soft synthetic resin is mounted in the method of producing the roller to which the tire is mounted so as to prevent racing in accordance with the present invention, the hard synthetic resin having the melting point higher than the melting point of the soft synthetic resin in the tire outer peripheral portion 13 is poured and charged into the gap 14 and then the soft synthetic resin having the low melting point and disposed on a boundary surface of the circular arc-shaped inner peripheral surface 16 corresponding to the inner peripheral surface of the tire 13 is again melted so as to be mixed in a state of being integrally melted with the poured hard synthetic resin, and the tire base portion 15 and the tire outer peripheral portion 13 formed by cooling the hardening the hard synthetic resin are bonded on the boundary surface in a completely inseparable state so as to be connected and adhered.

In order to mold the roller to which the tire obtained by overlaying the hard synthetic resin and the soft synthetic resin is mounted in the method of producing the roller to which the tire is mounted so as to prevent racing in accordance with the present invention, the soft synthetic resin disposed in the circular arc inner peripheral surface 16 of the tire outer peripheral portion 13 is brought into contact with the dissolved hard synthetic resin and is again dissolved to generate a gas, however, since the generated gas moves along the circular arc-shaped inner peripheral surface 16 protruding from the inner peripheral surface in the inner direction of the tire outer peripheral portion 13 and is completely discharged outward, the boundary surface between the tire outer peripheral portion 2 and the tire base portion 15 are completely adhered.

In order to mold the roller to which the tire obtained by overlaying the hard synthetic resin and the soft synthetic resin is mounted in the method of producing the roller to which the tire is mounted so as to prevent detachment in accordance with the present invention, the melting point of the soft synthetic resin of the tire outer peripheral portion 13 is set to 190° C. and the melting point of the hard synthetic resin forming the tire base portion 15 is set to 210° C., a difference between the melting points is being set as small as 20° C. Accordingly, it is possible to set a generating amount of a gas generated by an additional dissolution of the soft synthetic resin on the circular arc-shaped inner peripheral surface 16 of the tire outer peripheral portion 13 caused by the contact of the dissolved hard synthetic resin due to the pouring of the hard synthetic resin poured and charged into the gap 14 to an amount as small as possible, and further the again dissolved soft synthetic resin and the poured hard synthetic resin are mixed in a completely melting state, so that the tire outer peripheral portion 13 and the tire base portion 15 can be completely adhered without using the adhesive material.

EXAMPLE 1

The tire outer peripheral portion 13 is formed by the soft polyurethane rubber corresponding to one kind of the soft synthetic resin which has a melting point of 190° C. and is high in elasticity so as to have a ring shape of an outside diameter of 80 mm, an inside diameter of 64 mm and a thickness of 8 mm and protrude the inner peripheral surface in the inner direction thereof in the inner direction, thereby forming the circular arc-shaped inner peripheral surface 16 having a circular arc cross sectional shape.

The metal bearing 2 aligning the center point and having an outside diameter of 36 mm is arranged at a center position on the concentric circle within the ring-shaped tire outer peripheral portion 13 so as to annularly form the gap 14 having a thickness of 14 mm between the tire outer peripheral portion 13 and the bearing 2.

Within the metal mold 17 structured so as to recess a cavity portion 18 in such a manner as to arrange the tire outer peripheral portion 13, the bearing 2 and the gap 14 at the center thereof in the same state as that arranged as mentioned above, the metal mold 17 structured so as to arrange the tire outer peripheral portion 13, the bearing 2 and the gap 14 at the center thereof within as shown in FIG. 3 is mounted and fixed to the injection molding apparatus (not shown).

Next, in the polyurethane rubber belonging to the same kind as the soft polyurethane rubber to which the tire outer peripheral portion 13 is formed, the hard polyurethane rubber 23 which corresponds to one kind of the thermoplastic synthetic resin and which has the melting point of 210° C. is dissolved in a liquid state by the injection molding apparatus, poured into the cavity portion 18 from a spool 19 provided in the metal mold 17 through the nozzle and charged into the gap 14 provided in the middle between the tire outer peripheral portion 13 and the bearing 2 within the metal mold 17. In the manner mentioned above, when the thermoplastic hard polyurethane rubber 23 charged into the gap 14 is cooled and hardened, and is completely adhered or bonded to both of the tire outer peripheral portion 13 and the bearing 2 so as to be integrally adhered, the metal mold 17 is taken out to form the tire base portion 15, whereby the roller 1 structured such that the tire base portion 15 is integrally adhered or bonded between the tire outer peripheral portion 13 and the bearing 2 is produced so as to mount the layered synthetic resin tire 3.

In this case, when pouring the hard polyurethane rubber 23 dissolved in a liquid manner due to heating into the gap 14 between the outer peripheral portion 13 and the bearing 2, the gap being provided in the metal mold 17, the soft polyurethane rubber of the circular arc-shaped inner peripheral surface 16 of the tire outer peripheral portion 13 brought into contact with the dissolved hard polyurethane rubber 23 is again dissolved so as to generate a gas, however, the generated gas moves along the circular arc-shaped inner peripheral surface 16 protruding from the inner peripheral surface in the inner direction of the tire outer peripheral portion 13, and is completely discharged outward from an air vent 21 provided on a separating surface of a split metal mold 17, whereby the boundary surface between the tire outer peripheral portion 13 and the tire base portion 15 is completely adhered.

Further, since the hard polyurethane rubber 23 poured into the gap 14 from the injection molding apparatus and dissolved in a liquid state has a melting point of 210° C. higher than the melting point of 190° C. in the soft polyurethane rubber on the boundary surface corresponding to the surface portion of the circular arc-shaped inner peripheral surface 16 corresponding to the inner peripheral surface of the tire outer peripheral portion 13, the soft polyurethane rubber is again melted due to the pouring of the hard polyurethane rubber 23 so as to be mixed in a state of being integrally melted with the poured hard polyurethane rubber 23, and the tire base portion 15 and the tire outer peripheral portion 13 formed in accordance with a cooling and hardening operation of the hard polyurethane rubber 23 are completely melted in an integral and inseparable state, connected and adhered.

Peeling Test

As subjects for a peeling test, there are prepared the roller to which the tire is mounted so as to prevent racing produced in accordance with the producing method of the present invention, that is, the roller to which the tire obtained by overlaying the hard synthetic resin and the soft synthetic resin is mounted, which is used for the escalator and the like. The roller to which the tire obtained by overlaying the synthetic resin is mounted is structured such that the overlaying synthetic resin portion constituting the tire having a thickness of 22 mm is integrally adhered to the metal bearing having an outside diameter of 36 mm so as to form the roller having a total diameter of 80 mm. The tire portion formed in two layers by the synthetic resin is formed in the soft polyurethane rubber tire outer peripheral portion (a primary resin in the peeling test) having a hardness of 92 degrees in A scale (durometer hardness) and a thickness of 8 mm in the outer peripheral direction, and in the hard polyurethane rubber tire base portion (a secondary resin in the peeling test) having a hardness of 70 degrees in D scale (durometer hardness) and a thickness of 14 mm in the inner direction of the tire portion. These portions are integrally adhered/bonded in a inseparable state in two layers.

In this case, the peeling is estimated by a resistance when the primary resin and the secondary resin are forcibly peeled at five stages of numbers. In this case, since it is performed by hand-operated peeling, the estimation includes feeling estimation of the operator as shown in table 1 (FIG. 18).
1. A whitening exists on a secondary resin bonding surface.
2. Since a primary resin and a secondary resin are firmly bonded, a part of a secondary resin bonding surface is melted with a bonding surface of the primary resin.

Cutting Test

As subjects for a cutting test, preparations are made for the roller to which the tire is mounted so as to prevent racing produced in accordance with the producing method of the present invention, that is, the roller to which the tire obtained by overlaying the hard synthetic resin and the soft synthetic resin is mounted, which is used for the escalator and the like. The roller to which the tire obtained by overlaying the synthetic resin is mounted is structured such that the overlaying synthetic resin portion constituting the tire having a thickness of 22 mm is integrally adhered to the metal bearing having an outside diameter of 36 mm so as to form the roller having a total diameter of 80 mm. The tire portion formed in two layers by the synthetic resin is formed in the soft polyurethane rubber tire outer peripheral portion (a primary resin in the peeling test) having a hardness of 92 degrees in A scale and a thickness of 8 mm in the outer peripheral direction, and in the hard polyurethane rubber tire base portion (a secondary resin in the peeling test) having a hardness of 70 degrees in D scale and a thickness of 14 mm in the inner direction of the tire portion. These portions are integrally adhered/bonded in an inseparable state in two layers. The cutting test is applied only to the tire portion after the peeling test.

In this case, the cutting test method is applied onto a gate position line as the cutting place (confirmation whether or not a void exists). No void is generated on the cut surface and the adhesion/bonding is completely performed.

Breaking Test

A breaking test in accordance with a side load is performed with respect to the tire and the bearing (wheel) in the roller shown in the Example 1 molded on the basis of the method of producing the roller to which the tire is mounted so as to prevent racing in accordance with the present invention. (In this case, the breaking test is performed with respect to the roller in which two bearings are used.)

As subjects for a breaking test, preparations are made for the roller to which the tire is mounted so as to prevent racing produced in accordance with the producing method of the present invention, that is, the roller to which the tire obtained by overlaying the hard synthetic resin and the soft synthetic resin is mounted, which is used for the escalator and the like. The roller to which the tire obtained by overlaying the synthetic resin is mounted is structured such that the overlaying synthetic resin portion constituting the tire having a thickness of 14 mm is integrally adhered to the metal bearing (wheel) (product standard number 6202) having an outside diameter of 36 mm so as to form the roller having a total diameter of 80 mm. The tire portion formed in two layers by the synthetic resin is formed in the soft polyurethane rubber tire outer peripheral portion having a hardness of 92 degrees in A scale and a thickness of 8 mm in the outer peripheral direction, and in the hard polyurethane rubber tire base portion having a hardness of 70 degrees in D scale and a thickness of 14 mm in the inner direction of the tire portion. These portions are integrally adhered/bonded in an inseparable state in two layers. The tire breaking test in accordance with the side load is applied only to the tire portion of the roller formed in the above manner.

In this case, the breaking test is executed under a condition of a temperature of 22° C. and a humidity of 56% by using an autograph AG-50KNG.

Figure 19:
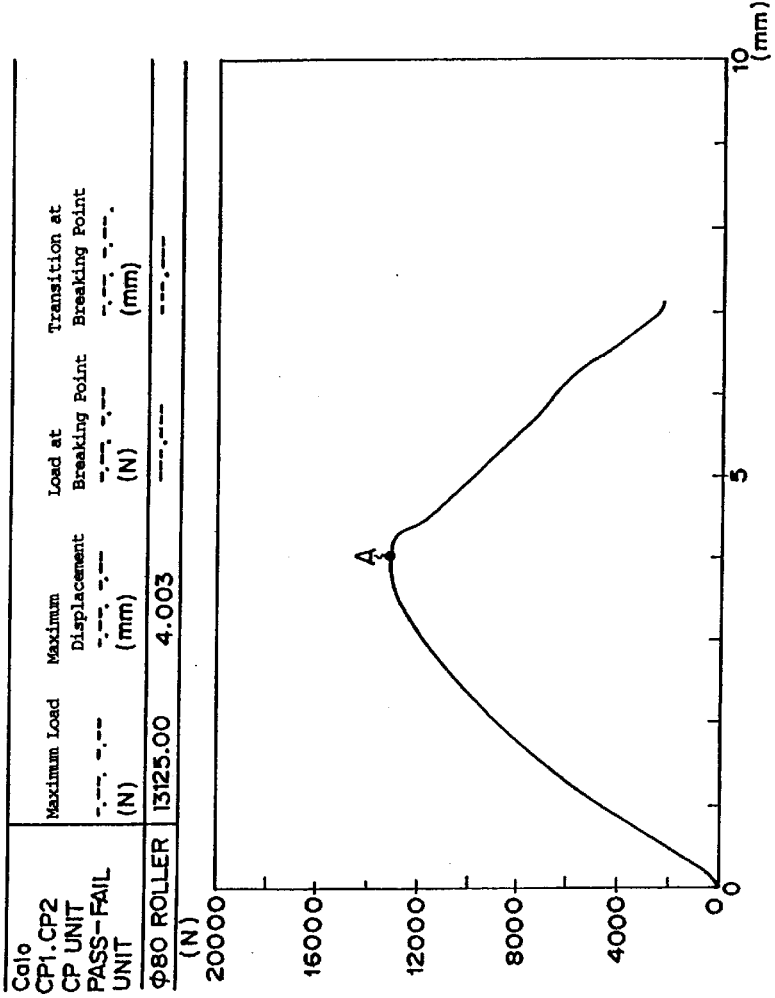
FIG. 19 is a graph which shows data of a cutting test result with respect to a roller to which a tire is mounted so as to prevent racing produced in accordance with the present invention, the table corresponding to Table 2.
Figure 20:
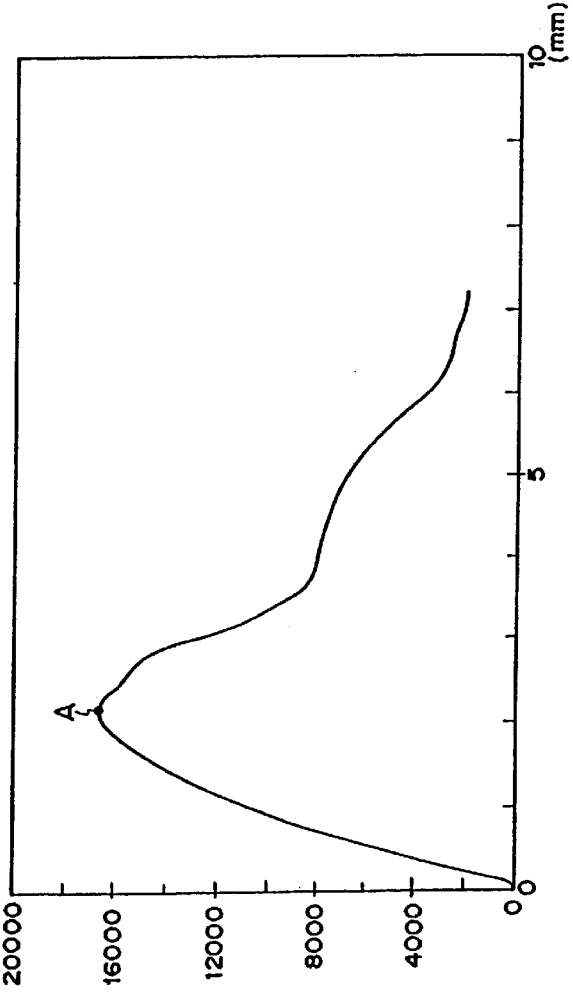
FIG. 20 is a graph which shows data of a cutting test result with respect to a roller to which a tire is mounted so as to prevent racing produced in accordance with the present invention, the table corresponding to Table 3.
Figure 21:
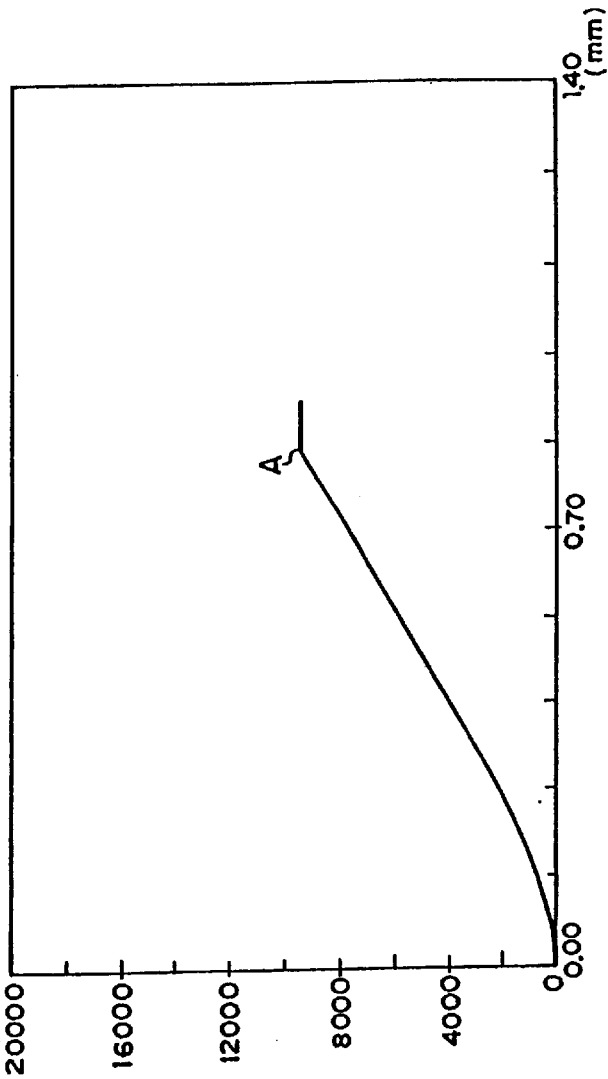
FIG. 21 is a graph which shows data of the result of a breaking test by a side load with respect to a roller to which a tire is mounted so as to prevent racing produced in accordance with the present invention, the table corresponding to Table 4.
Figure 22:
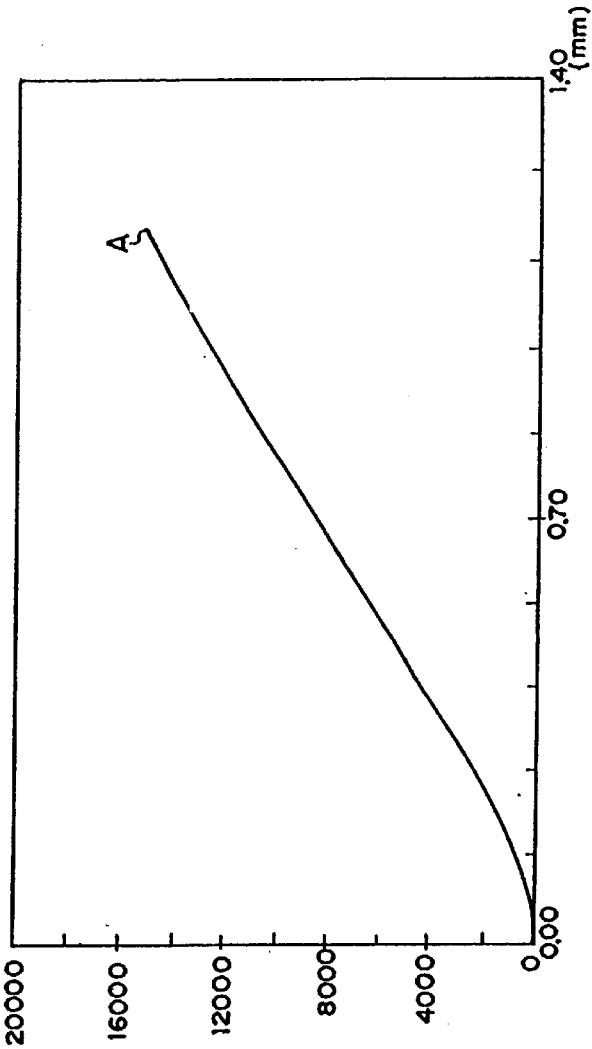
FIG. 22 is a graph which shows data of the result of a breaking test by a side load with respect to a roller to which a tire is mounted so as to prevent racing produced in accordance with the present invention, the table corresponding to Table 5.

Results of the breaking test are as shown in Tables 2 and 3 (FIGS. 19 and 20) with respect to the breaking test in accordance with the side load.

That is, the tire in the roller in accordance with the present invention can stand against the great load such as 1339 Kg in the side load.

Further, the bearing (wheel) in the roller in accordance with the present invention can stand against the great load such as 1690 Kg in the side load.

Further, a static load in this kind of conventional standard radial bearing (the bearing in the same standard as the bearing in the Example 1 in accordance with the present invention) is 760 Kg, and further, it is known that the side load corresponds to 15% the static load 760 Kg, and the side load is set to be a standard value, so that it is 114 Kg.

Since the roller produced by the method of producing the roller to which the tire is mounted so as to prevent racing in accordance with the present invention is structured such that the tire can stand against the side load of 1339 Kg and the bearing (wheel) can stand against the side load of 1690 Kg, it is possible to completely solve the problem that the roller resin molded to this kind of conventional bearing is weak against the thrust (side) load. Further, in the roller in accordance with the present invention, since the tire can stand against 11 times or more thrust (side) load and the bearing (wheel) can stand against the 14 times or more thrust (side) load in comparison with the conventional bearing, the roller resin molded to the bearing can be employed, which can not be used due to weakness against the thrust (side) load. Accordingly, in accordance with the roller of the present invention, it is possible to stand against a very high radial (static) load and thrust (side) load, there is an effect of being used without no fear of breaking in a portion to which a high load is applied.

Comparative Example

A static load test is applied to the bearing employed for the roller to which the tire is mounted so as to prevent detachment produced on the basis of the Example 1 in accordance with the present invention, and a conventional bearing produced and used in accordance with JIS standard, and results are shown in Tables 3 and 4 showing static load test data, and a comparison is performed.

In this case, subjects for the comparative test use a structure in (product standard number 6202). A static load test is applied to the bearing employed for the roller to which the tire is mounted so as to prevent racing produced on the basis of the Example 1 in accordance with the present invention, and a conventional bearing produced and used in accordance with JIS standard, and results are shown in Tables 4 and 5 showing static load test data, and a comparison is performed. In this case, subject for the comparative test use a structure in (product standard number 6202). Further, the bearing (product standard number 6202-2RS) used for the roller to which the tire is mounted so as to prevent detachment in accordance with the present invention, which is the subject for the comparative test means that a radial bearing structured such that two grooves are cut on the outer race of the radial bearing is used.

The results of the comparative test are shown in the graphs in Tables 3 and 4 showing the static load test data. The load at the breaking point in the conventional bearing is 966 Kg, and that of the present invention is 1524 Kg, so that it becomes apparent that the present invention has a strength which can stand against a 1.5 times static load.

Effect of the Invention

In this case, the comparative test is performed by the static load test under conditions of a temperature of 25° C. and a humidity of 42% with using an autograph AG-50KNG.

Since the roller in accordance with the present invention is structured such that one or a plurality of grooves are recessed on the outer peripheral surface of the outer race in the bearing, a part of the synthetic tire integrally adhered to the outer race of the bearing is inserted and bonded within the groove on the outer peripheral surface of the outer race in the bearing, whereby the firmer adhesion force can be obtained. Accordingly, there can be obtained an effect that the more firmly adhered fitting body is prevented from being peeled from the outer race of the bearing and the tire and the outer race of the bearing are prevented from separately detaching even when the bearing is exposed to the heavy load and rotates at a high speed, that is, the roller is adhered so as to prevent from rotating.

In an embodiment of the invention, the bearing in accordance with the present invention is structured such that a plurality of grooves are spirally recessed in parallel on the outer peripheral surface of the outer race in the bearing in a surrounding manner, or a plurality of grooves are recessed in a direction perpendicular to an axial direction of the bearing and in parallel to each other in a surrounding manner, or a plurality of grooves are spirally recessed in a surrounding manner so that the grooves cross to each other on the outer peripheral surface of the outer race. Accordingly, there is an effect that the area of the grooves which adhere the tire to the outer peripheral surface of the outer race is expanded at that degree so as to obtain the firmer adhesion force, the area of the grooves which adhere the tire to the outer peripheral surface of the outer race is expanded at that degree so as to obtain the firmer adhesion force, and the area of the grooves which adhere the tire to the outer peripheral surface of the outer race is expanded at that degree so as to obtain the firmer adhesion force.

In an embodiment of the invention, the bearing in the present invention is structured such that one of a plurality of grooves are spirally and obliquely recessed at a certain angle of incline with respect to an axial direction of the bearing. Accordingly, there is an effect that the area of the grooves which adhere the tire to the outer peripheral surface of the outer race is expanded at that degree so as to obtain the firmer adhesion force.

In an embodiment of the invention, the bearing in accordance with the present invention is structured such that a thickness of the outer race of the bearing is set to the same thickness obtained by adding the depth of the groove portion of the groove to the thickness of the outer race of the standard bearing in accordance with the international standard. As mentioned above, since the thickness of the outer race of the bearing 1 in the present invention is set to the same thickness obtained by adding the depth of the groove portion of the groove to the thickness of the outer race of the standard bearing in accordance with the international standard which is generally used, in the bearing in the present invention, there is effects that the strength of the outer race is not reduced even when the groove is recessed on the outer race in a surrounding manner, and there is no risk that the fitting body is peeled and falls off even when the horizontal load is applied.

In an embodiment of the invention, the roller to which the tire is mounted so as to prevent detachment is produced by the method comprising the steps of arranging the bearing having one or a plurality of grooves recessed on the outer peripheral surface of the outer race with providing the gap on the concentric circle inside the soft synthetic resin tire outer peripheral portion, and next pouring and charging the hard synthetic resin having the melting point higher than that of the soft synthetic resin in the tire outer peripheral portion into the gap formed between the tire outer peripheral portion and the outer race of the bearing so as to form the tire base portion, whereby the tire base portion is integrally adhered/bonded to the bearing and the tire outer peripheral portion. Accordingly, the hard synthetic resin for the tire base portion having the melting point higher than the tire outer peripheral portion is poured and charged, whereby a part of the soft synthetic resin in the tire outer peripheral portion corresponding to the contact surface with the poured hard synthetic resin in the tire base portion is again melted and the both resins are mixed to each other on the boundary surface so as to be hardened. Therefore, there is an effect that the firm adhesion force can be obtained, and the tire outer peripheral portion and the outer race are firmly and in an interlinking manner connected by the hard synthetic resin tire base portion which is charged into one or a plurality of grooves recessed on the outer peripheral surface of the outer race in the bearing so as to be hardened.

In an embodiment of the invention, the melting point of the soft synthetic resin in the tire outer peripheral portion is set to 190° C., the melting point of the hard synthetic resin in the tire base portion is set to 210° C. and the temperature difference is set to a comparatively small value 20° C. Accordingly, the tire outer peripheral portion and the tire base portion can be integrally adhered/bonded by pouring and charging the hard synthetic resin forming the tire base portion into the gap so as to easily again melt the soft synthetic resin on the inner peripheral surface of the tire outer peripheral portion. Therefore the soft synthetic resin is mixed with the hard synthetic resin so as to form the tire base portion. As a result, there is an effect that the tire outer peripheral portion and the tire base portion can be integrally adhered/bonded and an amount of the gas generated when the soft synthetic resin is again melted can be restricted as small as possible.

In an embodiment of the invention, the tire base portion is formed by the hard polyurethane rubber which corresponds to the thermoplastic synthetic resin belonging to the same group as that of the soft polyurethane rubber for forming the tire outer peripheral portion and has the melting point of 210° C. Accordingly, since the soft polyurethane rubber which is again melted by the hard polyurethane rubber poured and charged into the gap and forms the tire outer, and the hard polyurethane rubber have a good affinity and are easily mixed, it is possible to produce the roller provided with the layered synthetic resin tire, connected and adhered/bonded in a completely integral and inseparable state on the boundary surface with respect to the tire outer peripheral portion due to the formation of the tire base portion. Further, since the tire base portion is formed by the polyurethane rubber having the high melting point of 210° C., there is an effect that the tire base portion is not dissolved even when generating heat due to using the roller and being used under the high temperature.

In an embodiment of the invention, the gas generated by the again dissolution of the soft synthetic resin on the circular arc-shaped inner peripheral surface of the tire outer peripheral portion outward moves along the circular arc-shaped inner peripheral surface protruding form the inner peripheral surface in the inside direction of the tire outer peripheral portion so as to be charged outward. Accordingly, the boundary surface between the tire outer peripheral portion and the tire base portion can be completely adhered/bonded.

Since the method of producing the roller to which the tire is mounted so as to prevent detachment in accordance with the present invention is structured as mentioned above, it is possible to produce so as to give a suitable cushion performance to the tire. Further, since the tire base portion formed by the hard synthetic resin is completely and integrally adhered/bonded to the tire outer peripheral portion and the bearing, it is possible to sufficiently satisfy the required performance for the escalator roller which is exposed to the high load and requires the high speed rotation performance, the abrasion resistance and the elasticity. Since the tire structured such that the soft and hard synthetic resins are completely integrally adhered/bonded is also completely integrally adhered/bonded to the bearing, the roller to which the overlaid synthetic resin tire having the strength can be produced in a comparatively inexpensive manner and by a simple producing step with using no adhesive material. Accordingly, there is an effect that the producing cost can be reduced.

Further, in the roller which is frequently exposed to the high load and stopped for a significantly long time, for example, the escalator and the like, in accordance with the present invention, since the overlaid synthetic resin tire is mounted to the bearing, the tire outer peripheral portion made of the soft synthetic resin gives a suitable cushion performance to the tire, and the tire base portion made of the hard synthetic resin is completely integrally bonded to the tire outer peripheral portion and the bearing, that is, the tire is structured such as to have hard and soft two layers and the tire is completely adhered/bonded and fixed to the bearing, there is an effect that the tire is not recessed and the tire having the hard and soft two layers is not peeled even when the high load is applied for a long time.

What is claimed is:

1. A method of producing a roller to which a tire is mounted so as to prevent detachment therefrom, comprising the steps of:

providing a bearing having an outer race, at least one groove recessed on an outer peripheral surface of the outer race;

providing a tire outer peripheral portion comprised of a soft synthetic resin;

positioning the tire outer peripheral portion around the outer peripheral surface of the outer race with a concentric gap formed therebetween; and pouring and charging a hard synthetic resin having a melting point higher than that of the soft synthetic resin into the gap formed between the tire outer peripheral portion and the outer race of the bearing to form a tire base portion, whereby the tire base portion is integrally bonded to the bearing and the tire outer peripheral portion.

2. The method of producing a roller to which a tire is mounted so as to prevent detachment therefrom as claimed in claim 1, further comprising the step of protruding an inner peripheral surface in an inside direction of the tire outer peripheral portion towards a center direction thereof so as to form a circular arc inner peripheral surface having a cross section formed in a circular arc.

3. The method of producing a roller to which a tire is mounted so as to prevent detachment therefrom as claimed in claim 2, further comprising the step of spirally recessing the grooves on the outer peripheral surface of the outer race of the bearing in a surrounding manner, or recessing the grooves in a direction perpendicular to an axial direction of the bearing and the grooves are parallel to each other, or spirally and obliquely recessing the grooves at an angle of incline with respect to an axial direction of the bearing, or spirally recessing at least one of the grooves so as to cross the groove on itself on the outer peripheral surface of the outer race.

4. The method of producing a roller to which a tire is mounted so as to prevent detachment therefrom as claimed in claim 1, further comprising the step of spirally recessing the grooves on the outer peripheral surface of the outer race of the bearing in a surrounding manner, or recessing the grooves in a direction perpendicular to an axial direction of the bearing and the grooves are parallel to each other, or spirally and obliquely recessing the grooves at an angle of incline with respect to an axial direction of the bearing, or spirally recessing at least one of the grooves so as to cross the groove on itself on the outer peripheral surface of the outer race.

5. A method of producing a roller to which a tire is mounted so as to prevent detachment therefrom, comprising the steps of:

providing a bearing having an outer race, at least one groove recessed on an outer peripheral surface of the outer race;

providing a tire outer peripheral portion comprised of a soft synthetic resin having a melting point of about 190° C.;

positioning the tire outer peripheral portion around the outer peripheral surface of the outer race with a concentric gap formed therebetween; and heating, melting, pouring and charging a hard synthetic resin having a melting point of about 210° C. into the gap formed between the tire outer peripheral portion and the outer race of the bearing to form a tire base portion, whereby the tire base portion is integrally bonded to the bearing and the tire outer peripheral portion.

6. The method of producing a roller to which a tire is mounted so as to prevent detachment therefrom as claimed in claim 5, further comprising the step of protruding an inner peripheral surface in an inside direction of the tire outer peripheral portion towards a center direction thereof so as to form a circular arc inner peripheral surface having a cross section formed in a circular arc.

7. The method of producing a roller to which a tire is mounted so as to prevent detachment therefrom as claimed in claim 5, further comprising the step of spirally recessing the grooves on the outer peripheral surface of the outer race of the bearing in a surrounding manner, or recessing the grooves in a direction perpendicular to an axial direction of the bearing and the grooves are parallel to each other, or spirally and obliquely recessing the grooves at an angle of incline with respect to an axial direction of the bearing, or spirally recessing at least one of the grooves so as to cross the groove on itself on the outer peripheral surface of the outer race.

8. A method of producing a roller to which a tire is mounted so as to prevent detachment therefrom, comprising the steps of:

providing a bearing having an outer race, at least one groove recessed on an outer peripheral surface of the outer race;

providing a tire outer peripheral portion comprised of a soft polyurethane rubber having a melting point of about 190° C.;

positioning the tire outer peripheral portion around the outer peripheral surface of the outer race with a concentric gap formed therebetween; and heating, melting, pouring and charging a thermoplastic hard urethane rubber having a melting point of 210° C. into the gap formed between the tire outer peripheral portion and the outer race of the bearing to melt a part of the soft polyurethane rubber in contact with the thermoplastic hard urethane rubber, thereby forming a tire base portion, whereby said tire base portion is integrally bonded to the bearing and the tire outer peripheral portion.

9. The method of producing a roller to which a tire is mounted so as to prevent detachment therefrom as claimed in claim 8, further comprising the step of protruding an inner peripheral surface in an inside direction of the tire outer peripheral portion towards a center direction thereof so as to form a circular arc inner peripheral surface having a cross section formed in a circular arc.

10. The method of producing a roller to which a tire is mounted so as to prevent detachment therefrom as claimed in claim 8, further comprising the step of spirally recessing a plurality of grooves on the outer peripheral surface of the outer race of the bearing in a surrounding manner, or recessing the grooves in a direction perpendicular to an axial direction of the bearing and in parallel in a surrounding manner, or spirally and obliquely recessing the grooves at an angle of incline with respect to an axial direction of the bearing, or spirally recessing the groove so as to cross said grooves to each other on the outer peripheral surface of the outer race.

* * * * *